United States Patent [19]

Cowx

[11] Patent Number: 5,368,627
[45] Date of Patent: Nov. 29, 1994

[54] TREATMENT OF OXIDE-CONTAINING DUSTS

[76] Inventor: Peter M. Cowx, 3 New Cottages, Berrycroft, Ashbury, Wiltshire SN6 8LX, Great Britain

[21] Appl. No.: 45,342

[22] Filed: Feb. 19, 1993

[51] Int. Cl.⁵ ............... H05B 7/12; C21C 5/52; F27B 14/06
[52] U.S. Cl. .................... 75/10.19; 373/18; 373/22
[58] Field of Search ............ 75/10.19; 373/18, 22

[56] References Cited

U.S. PATENT DOCUMENTS 3,834,895  9/1974  Cachat ............................... 75/11
3,868,987  3/1975  Galey ............................... 75/10.24

Primary Examiner—Peter D. Rosenberg

[57] ABSTRACT

An arc is drawn between a movable electrode (E) (preferably graphite), and a fixed electrode (7) in a furnace when smelting metal oxides using a plasma. Shielding gas, e.g. N. is introduced into plenum (P) about the movable electrode (E) to prevent metal vapor from settling on the inner lining (3;9) of the furnace (1). The movable electrode (E) may be connected to a mast (30) on the furnace roof (4) to align that electrode (E) in its path through a hole (10) in the roof (4) into the furnace chamber (C).

17 Claims, 3 Drawing Sheets

TREATMENT OF OXIDE-CONTAINING DUSTS

The invention relates to the treatment of oxide-containing dusts and especially but not exclusively to the treatment of waste dusts arising at steelworks. For convenience, the invention will be described more specifically in relation to that use.

During the melting and refining of stainless steels in Electric Arc Furnaces and the Argon Oxygen Decarburization vessels, between one and two percent of the charge is converted into a fine fume comprising metal oxides, and typically containing 0-20% $Cr_2O_3$, 0-4% NiO, 0-2% $MoO_3$, 0-50% $Fe_2O_3$ or i.e. 40% ZnO, 0-10% PbO, 0-20% CdO, the remainder being gangue oxides, etc. The continuing high prices commanded by chromium, nickel, molybdenum and zinc provide considerable commercial incentive for the recovery of these metals as an alloy and condensed metal. The regulations for the disposal of waste dusts are becoming increasingly stringent because of the leachability of the lead, cadmium and hexavalent chromium by ground water. As a hazardous waste, the dust must be encapsulated or transported to a controlled land-fill at a high cost.

The dust is too fine (about 80% by weight is less than 8 micron in diameter) to permit direct recycling to the arc furnace. It is possible to agglomerate the fume and add that to the furnace with excess reductant, but this is not cost effective.

It is one object of this invention to provide plasma arc apparatus and a method for the treatment of waste materials containing metal oxides, especially fine dusts, which is efficient and cost effective. More particularly it is an object of the invention to provide plasma arc apparatus and a method for the smelting of fine dusts or other particulates comprising the oxides of metals which are vaporisable and electrically conductive. The apparatus used in this invention is a so-called plasma arc furnace wherein an arc is drawn between electrodes in a sealed environment to create a plasma state at very high temperatures, typically about 6000° C. to about 20,000° C. The plasma may be activated species of electrons, ions, radicals, and nascent gases such as atomic hydrogen and nitrogen can be present.

According to the invention in a first aspect there is provided a furnace for smelting particulate metal oxides, the furnace comprising an outer shell having a refractory lining and defining a heat treatment chamber, means for supplying gas into the furnace, fixed electrode means mounted in a wall of the chamber and movable electrode means mounted in the roof of the chamber for movement into and out of the chamber to draw an arc between the electrodes thereby to form a plasma of the gas, the movable electrode means comprising carbonaceous material and being surrounded by gaseous shielding means.

According to the invention in another aspect there is provided a furnace for smelting particulate metal oxides, the furnace comprising an outer shell having a refractory lining and defining a heat treatment chamber, one or more plasma torches mounted in the roof or wall of the chamber for the formation of a plasma gas to heat the contents of the chamber, gaseous shielding means being present adjacent the outlet of the torches.

Our investigations have shown that when a particulate oxide of a metal which is vaporisable and electrically conductive is smelted in a furnace where the heat is generated by electrical means, the vaporised metal can condense on or impregnate parts of the furnace which are intended to be electrically insulating. Because the condensed metal parts are conductive, electrical paths are created leading to short circuits and breakdown. This can shorten the life of those parts, which means that the furnace needs to be shut down and repaired more frequently than would otherwise be the case. A major function of the gaseous shielding means is to urge such particles away from the movable electrode means and so isolate that means from the furnace wall bounding the aperture through which the movable means travels.

Preferably the shielding means comprises a gas inert with respect to the electrode means and the metals of the melt and which is circulated within the region about the location where the movable electrode means enters the furnace. Typically the gas will be nitrogen or argon and is introduced into the furnace at the roof level about the annulus through which the electrode means passes.

The vaporised metal is usually passed from the furnace to a condensor and the atmosphere in the furnace is under a positive pressure. For this reason the shielding gas must be introduced under sufficient pressure to maintain the slight pressure in the furnace and exclude ambient air. The exclusion of ambient air can be particularly important because the air will affect the intended $CO/CO_2$ ratio in the furnace leading to reoxidation of metal.

The movable electrode means may comprise one or more electrodes. For example there may be one such electrode where a D.C. arc is to be drawn by that and the fixed electrode means. The number of fixed electrodes may vary; preferably there are six. Three electrodes may be in the roof and/or wall of the furnace where an A.C. arc is drawn or where a negative and positive polarity D.C. graphite electrodes are mounted in the roof or wall.

The fixed electrode means may comprise one or more electrodes mounted in the hearth or side wall of the chamber. The open arc mode is preferred because:
    the energy input is independent of the slag resistivity
    the electrode consumption is minimised
    the build-up of feed material against the furnace sidewalls can be controlled by altering the arc length.

The use of a D.C. plasma system offers an efficient means of transferring heat to the melt because it requires only one movable electrode means in the roof.

The movable electrode means is preferably provided with means for introducing a plasma gas. Most preferably this comprises a generally axially disposed bore through the movable electrode means and through which the plasma gas passes to the furnace.

The movable electrode means can be formed of a graphite. Specific examples include prebaked, partially graphitised carbon, and porous graphite. The graphite is consumed in use and a feature of the invention may be that the rate of consumption is less than one would have expected.

Because the movable electrode is consumed in use, it is preferable to form the electrode in lengths which are joined in end-to-end relation, for example by a screw thread, or male nipple received in a socket therefor. Preferably, as indicated, the lengths include a through-bore for the plasma gas, typically argon or nitrogen, which bore may be in the axis of the length or offset from the axis of the length. The free end of the electrode may be fitted with a suitable electrical connection for arc leads and a connection for shielding gas or the like. The electrode lengths may be of any cross-sectional shape but round is preferred.

Most preferably the electrode travels in a cylinder or tube mounted vertically on the roof, there being an annular clearance between the electrode and the inner wall of the tube. Packing material is present in the clearance to align the electrode and to prevent ingress of air and escape of vaporised metal and shielding gas. The tube may be provided with an outer water cooling jacket system.

It is important for reliable operation that the electrode be arranged to travel along a path in the axis of the annulus in the roof through which it passes, because if the electrode is out of alignment shielding gas can escape from its intended path and air can ingress. In an extreme case, vaporised metal can reach into the cylinder and condense there. For this purpose it is a much preferred feature of the invention that the movable electrode be supported by guide means which hold the electrode substantially in the axis of the annulus, i.e. the intended path of travel. Most preferably, the electrode is held by clamping means to guide means in the form of a mast mounted on the roof of the furnace adjacent the annulus and parallel to the intended path of travel of the movable electrode.

In another aspect the invention provides a furnace for use in treatment of material; the furnace comprising an outer shell having a refractory lining and defining a heat treatment chamber, means for introducing a gas into the furnace, fixed electrode means mounted in a wall of the chamber and a movable electrode means mounted in the roof of the furnace for movement into and out of the chamber to draw an arc between the electrodes, thereby to cause a plasma of the gas, guide means, preferably in the form of a mast, being present a short distance from the movable electrode means and arranged to guide the movable electrode(s) in the path of travel.

The process is operated so that the temperature of the slag and the metal is between about 1400° and 1700° C., preferably about 1500° C.

The invention is especially useful in the smelting of dusts or fume comprising oxides of metals such as zinc, lead, cadmium, magnesium and manganese. The waste material to be treated according to the invention may be any one or more of an AOD dust or fume, EAF dust or fume or material arising from the treatment of any steel or other metallurgical process, such as millscale or plasma cuttings.

If necessary these materials will be dried before smelting. The oxidic feed materials will be blended with a carbonaceous reductant (e.g. coal) and flux (silica) and smelted in the plasma arc furnace to produce a ferroalloy containing Fe, Cr, Ni, Mo, C and the like for recycling to the ILVA arc furnaces.

The stoichiometric quantity of coal/coke for the reduction of say $Cr_2O_3$, $Fe_2O_3$, NiO, $MoO_3$, ZnO, PbO and the like is blended with the feed. Depending upon the gangue oxides in the feed materials, a small amount of CaO or $SiO_2$ may be added to the blend.

Our investigations have shown that there is considerable advantage in using furnace of the invention to treat EAF and AOD fume in that the furnace will accept a range of feed material, including unagglomerated fume, the energy input to the furnace is independent of the furnace atmosphere, oxygen potential or slag chemistry, the furnace allows very reducing furnace conditions to be maintained in order to maximise the recovery of the alloy element oxides to a ferroalloy, the high energy density results in high smelting rates and small reactor sizes, the fully molten bath allows a range of slag chemistries to be used, and the furnace can be rapidly started up and shut down. The invention offers other advantages. For example, if the slag foams up and reaches up to coat the graphite electrode no harm will be done. There is reduced consumption of the plasma gas and the gas selected can be relatively cheap. The power can readily be adjusted and the diameter of the electrode can be varied accordingly.

Preferably the charge is introduced through a port or ports in the roof of the furnace through sealed screw conveyors, rotary valves or lock hoppers and falls into the molten slag bath in the treatment chamber where it dissolves and the metallic oxides are carbothermically reduced by carbon and carbon monoxide to a ferroalloy or vaporised metal according to the reaction:

$$M_2O_3 + 3C = 2M + 3CO$$

$$M_2O_3 + 3CO = 2M + 3CO_2$$

$$3CO_2 + 3C = 6CO$$

In another aspect, the invention provides a method of smelting metal oxides, the method comprising, (i) supplying the oxides, a fluxing agent and a reductant to the heat treatment chamber of a furnace, the furnace comprising an outer shell having a refractory lining defining the heat treatment chamber, first electrode means mounted in a wall of the chamber and movable electrode means mounted in the roof for movement in and out of the chamber to draw an arc between the electrodes, the movable electrode means comprising carbonaceous material and being surrounded by gaseous shielding means, (ii) drawing an arc between the movable and fixed electrodes and (iii) supplying shielding gas to urge vaporised metal away from the lining of the furnace.

After smelting the alloy will be tapped into a ladle and then into ingot moulds and the slag into a slag pot. The non-toxic calcium silicate slag, free of heavy metals, may be disposed of as landfill. The exhaust gas from the furnace containing carbon monoxide, hydrogen and any volatile metals will be burnt with process air in a combustion chamber, cooled and dedusted in a baghouse filter before being discharged to the atmosphere.

In order that the invention may be well understood it will now be described by way of illustration only with reference to the accompanying drawings, in which.

Figure 1:
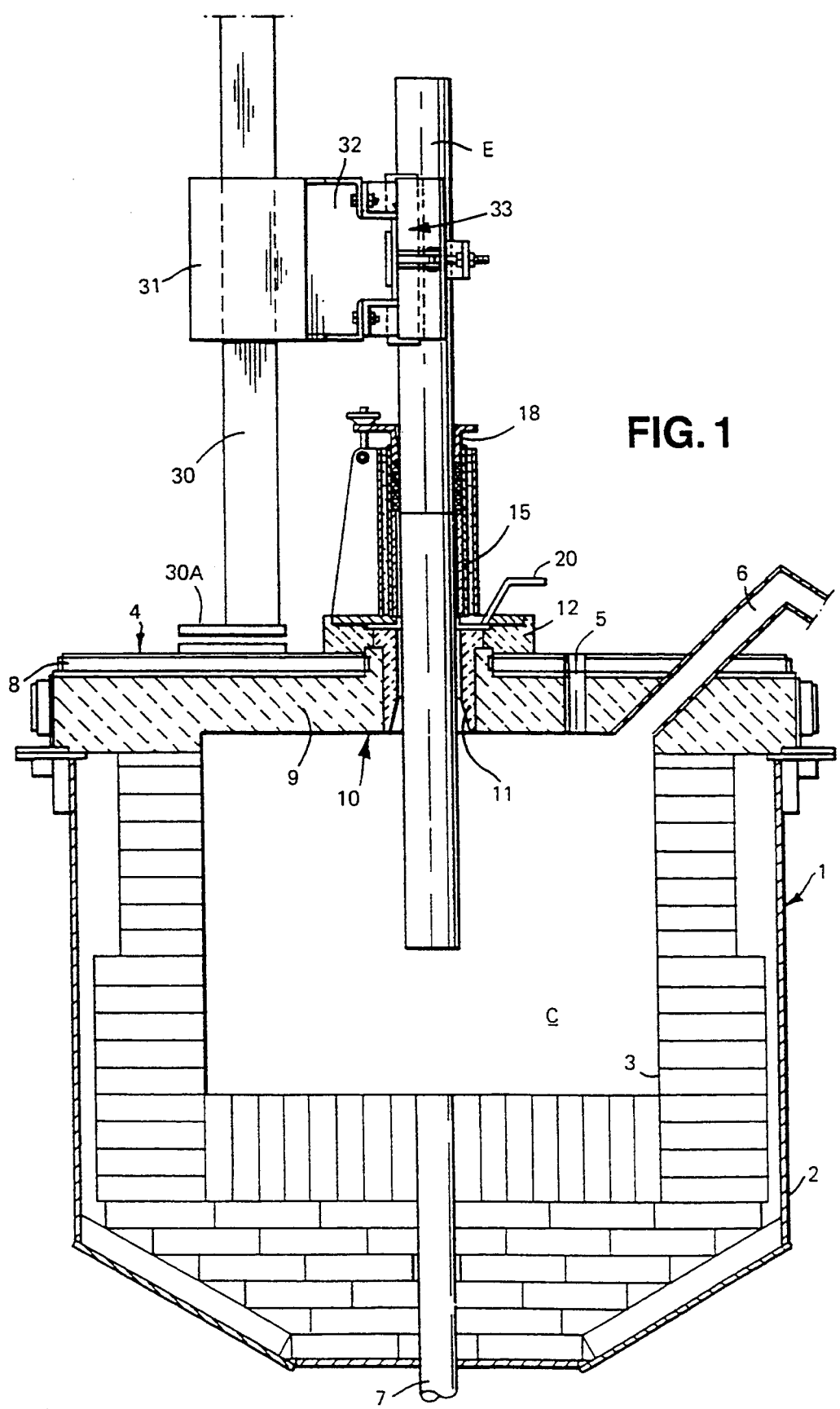
FIG. 1 is a vertical sectional view of one form of furnace.
Figure 2:
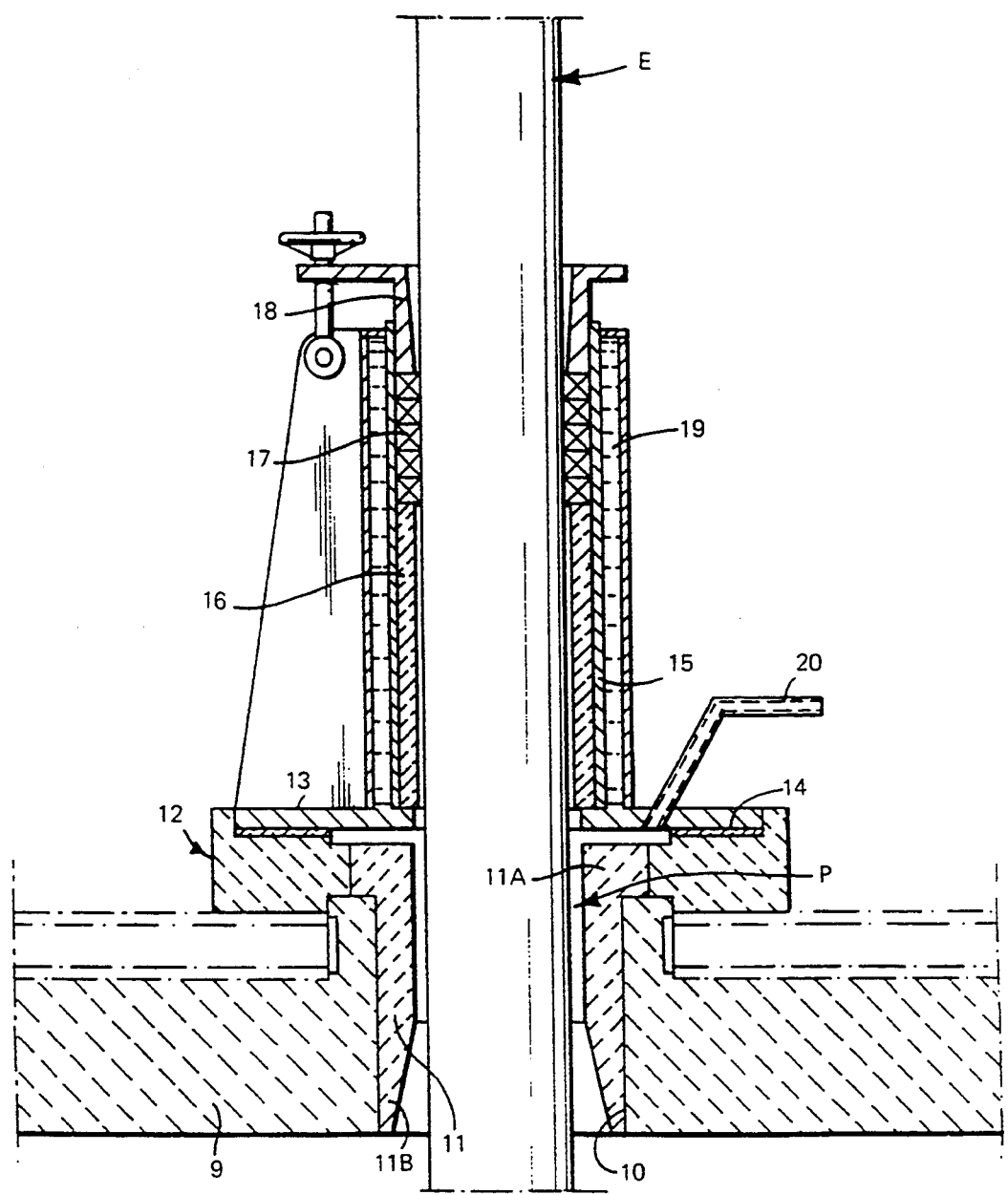
FIG. 2 is a detail of FIG. 1 drawn to an enlarged scale.

The apparatus comprises a furnace 1 formed of an outer shell 2 made of rolled steel and having an inner refractory brick lining 3 defining a heat treatment chamber C. The inner lining comprises magnesia bricks. The furnace 1 has a detachable roof 4 which is water cooled externally and has an internal refractory lining. Inlet ports 5 (one shown) are present in the roof 4 and contain sealed screw feeders, not shown. An outlet 6 is present in the roof 4 to pass vaporised metal and exhaust gases to a baghouse via a condenser, not shown. The furnace is completely sealed except for the exhaust gas port and operates under an internal positive pressure of about 25 Pa. Metal anodes 7 e.g. stainless steel, extend from the hearth of the furnace into the heat treatment chamber C. Typically there are six such anodes. The furnace roof 4 is formed of a metal shall 8 having a cast refractory lining 9, e.g. chrome bonded tabular alumina. A throughbore 10 is present at the top centre of the roof 4. A single D.C. graphite electrode E extends through the bore 10. The electrode E is about 30 cm in diameter and the bore 10 is about 80 cm in diameter. The electrode E has an axial throughbore, not shown, for the passage of a plasma gas. The bore is about 10 mm in diameter and the gas is nitrogen or argon. The electrode E is made up of a number of electrode lengths, joined in end-to-end relation, e.g. by a screw thread connection, not shown. The electrode is of relatively smaller diameter than the bore 10 and the annular gap is filled by a replaceable refractory insert 11. The insert 11 comprises a top annular disc 11A having an integral depending tube 11B. The disc 11A sits on the rim of the bore 10. The inner diameter of the tube 11B is relatively larger than the electrode E. The tube 11B extends the depth of the refractory lining of the roof 4 and is outwardly flared at its lower end. The disc 11A sits within the periphery of an outer refractory disc 12. The top of the disc 12 is recessed and a plate 13 is received in the recess with a horizontal ceramic fibre blanket seal 14 in between. A cylinder 15 is mounted on the plate 13 about the electrode E. The inside diameter of the cylinder is greater than the electrode E and the annular clearance is fitted with a refractory collar 16. A ceramic fibre gland packing mass 17 is present at the upper end of the cylinder on top of the collar 16 and a pressure adjusting system 18 is present at the top of the cylinder 15 to apply pressure to the packing and collar. A water cooling jacket 19 forms the outer wall of the cylinder 15. Pipes 20 are connected to the plate 13 about the cylinder 15 for the inward passage of a shielding gas, e.g. nitrogen, which passes through the seal 14 into the annular clearance between the inside of the tube 11B and the electrode E, which clearance constitutes a gas purge plenum P.

Figure 3:
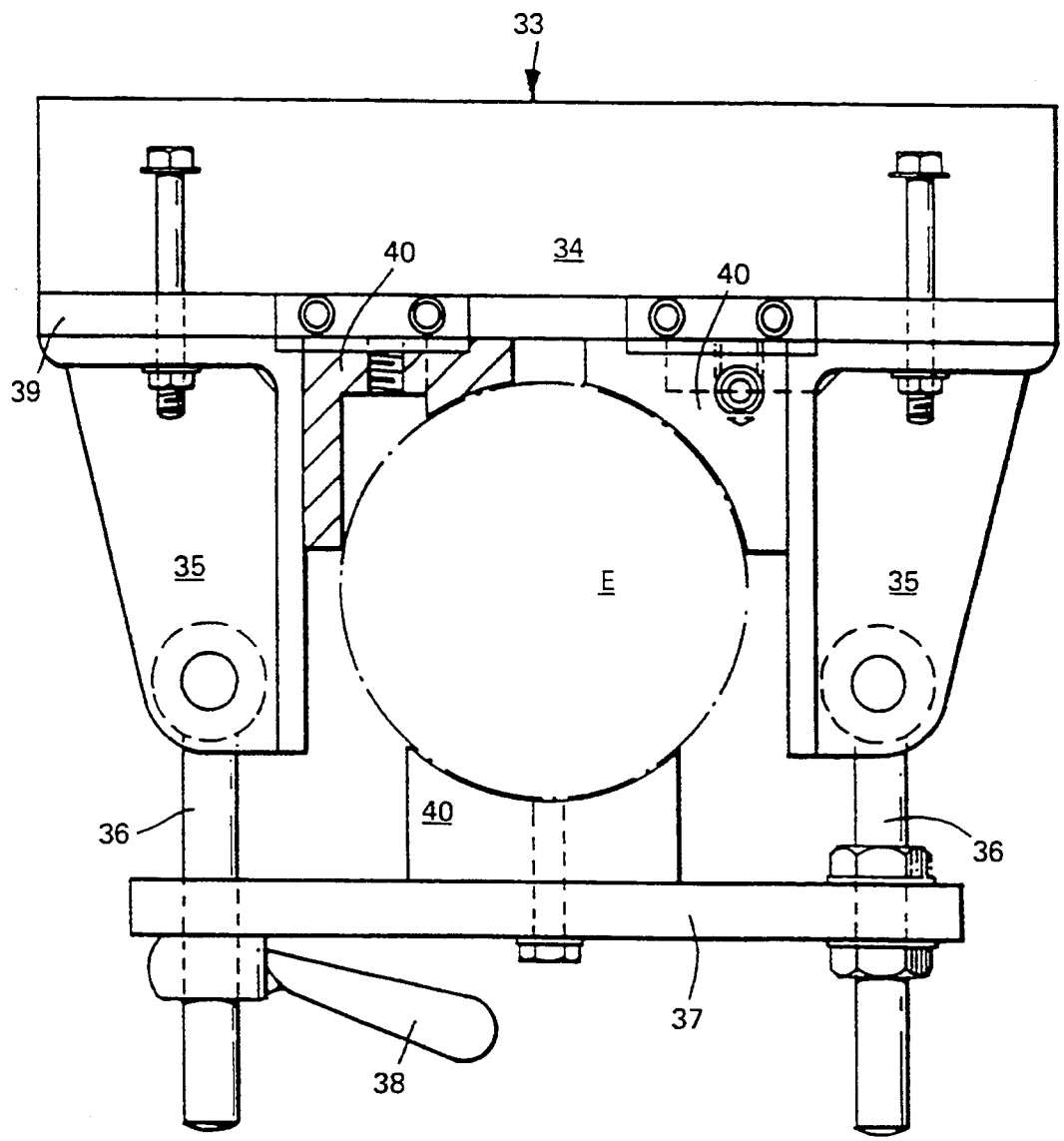
FIG. 3 is a top plan view, partly in section, of the connection of the electrode to the mast on the roof of the furnace of FIG. 1.

A mast 30 is bolted to the roof by means of bolts passing through a plate 30A at a location a short distance from the throughbore 10. The height of the plate 30A can be adjusted. The mast 30 is of square cross-section. A short arm 31 has a square collar 32 at one end which is received on the mast 30 and, at the other end, a clamping system 33 to engage the electrode E. As best shown in FIG. 3, the clamping system 33 comprises a back wall 34 from which extend two steel side walls 35, at the ends of which are rods 36 to which a clamping plate 37 is fitted. A handle 38 is present to lock the plate 37 on the rods 36. A copper connector 39 is present on the back wall 34 to provide power to the electrode. Three shaped copper electrode interface blocks 40 are present, two in the corners of the back wall 34 and the side walls 35, and the third on the inside wall of the plate 37. Blocks of glass fibre-epoxy insulating material are present to electrically insulate the parts. The electrode E is held by the clamping system 33 to the mast 30 and, in use, is lowered or raised as required. Because of the accurate mounting of the mast and the short length of the arm 31, the electrode E can be guided to follow its intended path of travel with little or no deviation.

In use, a waste material to be treated, e.g. AOD fume dust or metallurgical waste, a fluxing agent, e.g. silica sand, and a carbon reductant are charged to the furnace via the inlet port 5. The electrode E is lowered to the in use position. An arc is struck to provide energy for the carbothermic reduction. The shielding gas flows through the pipes 20 into the plenum. The temperature of the slag reaches about 1400° C. to about 1600° C. The electrode is raised or lowered as required to maintain the arc length at the predetermined level. The metal oxides are reduced to ferroalloy which falls to the floor of the chamber and a slag that floats on top. Vaporised metal particulates are blown away from the refractory lining of the roof by the flow of the shielding gas, so preventing condensation of conductive metal therein and ingress of metal into the cylinder. From time to time the liquid metal and slag are separately tapped off via a tap hole, not shown. The liquid metal is tapped at about 1500° C. Vaporised metal passes via the exhaust 6 to a baghouse, not shown, where it is collected. At the end of the process, the products are ferroalloy and slag both of little or no toxicity and which can be used directly in the steel making process. The presence of individual parts enables easy replacement if required and electrically conductive paths are short.

The invention is further illustrated by the following examples in which parts are by weight unless otherwise specified.

EXAMPLE 1

A fine dust as specified in Table I was reduced in a furnace according to FIG. 1 by mixing the AOD dust with 2% SiO2 as fluxing agent and 18% anthracite as carbon reductant. The results obtained are shown in Table I from which it is clear that the slag produced is non toxic and is acceptable for dumping in certain situations, and that the recovery of Fe, Cr, and Ni are high.

EXAMPLE 2

AOD dust was treated using a furnace according to FIG. 1, in which the fluxing agent was 2% SiO2 and the reductant was 18% anthracite. The electrode was water cooled and a plasma was used. The purging gas used to shield the electrode, prevent condensation of vaporised metal in the furnace and exclude ambient air was argon flowing at the rate of 0.4 m 3/min. The plasma gas was argon.

The invention is not limited to the embodiments shown. For example there may be a number of electrodes arranged in say a circle for an A.C. arc. The material treated need not be a waste dust. The proportions of the charge and the product may vary from those shown. The furnace may have supplementary cooling means. The electrodes need not be in the floor and roof as shown.

TABLE I

| | Analysis % by weight | | |
|---|---|---|---|
| | AOD | Slag Analysis | Baghouse Dust Analysis |
| $Fe_2O_3$ | 42 | 2.1 | 8.8 |
| $Cr_2O_3$ | 16 | 4.2 | 2.4 |
| NiO | 3 | 0.2 | 0.6 |
| MnO | 6 | 11.5 | 7.4 |
| $MoO_3$ | 1 | 0.2 | 0.4 |
| ZnO | 7 | 0.2 | 30.0 |
| $Pb_3O_4$ | 1 | 0.1 | 5.5 |
| $SiO_2$ | 7 | 34.0 | 7.0 |
| CaO | 5 | 22.6 | 6.5 |
| MgO | 2 | 10.1 | 10.7 |
| S | 0.19 | — | — |
| $Al_2O_3$ | 1.0 | 7.7 | 2.4 |
| $K_2O$ | 1.0 | 0 | 2.7 |

TABLE I-continued

| | Analysis % by weight | | |
|---|---|---|---|
| | AOD | Slag Analysis | Baghouse Dust Analysis |
| CdO | 0.1 | 0 | 1.03 |

I claim:

1. A furnace for smelting particulate metal oxides, the furnace comprising an outer shell having a refractory lining and a roof, the shell and roof defining a heat treatment chamber, means for supplying gas into the chamber, fixed electrode means mounted in a wall of the chamber and movable electrode means mounted in the roof of the furnace for movement into and out of the chamber to draw an arc between the electrodes thereby to form a plasma of the gas, wherein the movable electrode means comprises carbonaceous material and being surrounded by gaseous shielding means to urge particles of metal oxides away from the lining to prevent condensation of conductive metal therein.

2. A furnace according to claim 1, wherein the atmosphere in the chamber (C) is maintained at a positive pressure, preferably about 25 Pa.

3. A furnace according to claim 1, wherein the or each movable electrode (E) includes a throughbore for the passage of a plasma gas whereby the plasma is present to smelt the metal oxides.

4. A furnace according to claim 1, wherein the inert gas of the shielding means is nitrogen or like gas.

5. A furnace according to claim 1, wherein the shielding means comprises a gas inert with respect to the movable electrode means (E) and circulated (P) about the movable electrode means (E) at least in the region where the movable electrode means (E) enters the furnace chamber (C).

6. A furnace according to claim 1, wherein the gas is introduced into the annular clearance between the movable electrode means (E) and an aperture or apertures (10) in the roof (4) of the furnace through which the or each movable electrode (E) making up the movable electrode means passes.

7. A furnace according to claim 1, wherein a replaceable refractory insert (11) is mounted in the annular clearance between the or each movable electrode (E) and the aperture (10) therefor.

8. A furnace according to claim 7, wherein the insert (11) comprises a disc (11A) having a depending tube (11B), the disc (11A) sitting within a disc (12) mounted on the roof (4) about the aperture (10).

9. A furnace according to claim 1, wherein the or each movable electrode (E) passes through a cylinder (15) mounted on the roof (4) of the furnace, the cylinder being dimensioned so that there is an annular clearance between the respective electrode (E) and the inner wall of the cylinder (15), refractory material (16,17) being present in the clearance.

10. A furnace according to claim 1, wherein the or each movable electrode (E) is engaged by clamping means (33) extending from guide means (30) mounted on the roof (4) a short distance from and generally parallel to the respective movable electrode means (E) to guide the movable electrode (E) in its path of travel.

11. A furnace according to claim 10, wherein the clamping means (33) includes the electrical connection (39,40) to a power supply for the movable electrode (E).

12. A furnace according to claim 1, wherein the movable electrode means (E) comprises a single movable electrode whereby a D.C. arc is drawn between that electrode and the fixed electrode means (7).

13. A furnace according to claim 1, wherein there is a plurality of movable electrodes (E) and an A.C. arc is drawn between the movable electrodes (E) and the fixed electrode means (7).

14. A furnace according to claim 1, wherein the or each movable electrode (e) is formed of a graphite, preferably prebaked graphite.

15. A method of smelting particulate oxides of vaporisable metals, the method comprising, (i) supplying the oxides, a fluxing agent and a reductant and a gas which can be made to plasma to the heat treatment chamber (C) of a furnace (1), the furnace (1) comprising an outer shell (2) having a refractory lining defining the heat treatment chamber (C), fixed electrode means (7) mounted in a wall of the chamber and movable electrode means (E) mounted in the roof (4) of the chamber for movement into and out of the chamber to draw an arc between the electrodes (E,7), the movable electrode means (E) comprising carbonaceous material and being surrounded by gaseous shielding means (P), (ii) drawing an arc between the movable (E) and fixed electrodes (7) thereby to plasma the gas to carbothermically smelt the metal oxides and (iii) supplying shielding gas to urge vaporised metal away from the lining of the furnace.

16. A method according to claim 15, wherein the gas to be made to plasma is argon or nitrogen.

17. A method according to claim 15, wherein the atmosphere in the chamber (C) is maintained under positive pressure, about 25 Pa.

* * * * *